United States Patent
Khalid et al.

(10) Patent No.: US 12,199,668 B2
(45) Date of Patent: Jan. 14, 2025

(54) RECEIVING SYSTEM FOR HIGH SPEED AND LARGE COVERAGE OPTICAL WIRELESS COMMUNICATION

(71) Applicant: SIGNIFY HOLDING B.V., Eindhoven (NL)

(72) Inventors: Amir Masood Khalid, Eindhoven (NL); Christian Jordan, Venlo (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 160 days.

(21) Appl. No.: 18/019,476

(22) PCT Filed: Jul. 21, 2021

(86) PCT No.: PCT/EP2021/070326
§ 371 (c)(1),
(2) Date: Feb. 2, 2023

(87) PCT Pub. No.: WO2022/028888
PCT Pub. Date: Feb. 10, 2022

(65) Prior Publication Data
US 2023/0283374 A1 Sep. 7, 2023

(30) Foreign Application Priority Data
Aug. 6, 2020 (EP) .................................... 20189817

(51) Int. Cl.
*H04B 10/112* (2013.01)
*H04B 10/114* (2013.01)
(Continued)

(52) U.S. Cl.
CPC .......... *H04B 10/116* (2013.01); *H04B 10/112* (2013.01); *H04B 10/114* (2013.01); *H04B 10/1149* (2013.01); *H04B 10/69* (2013.01)

(58) Field of Classification Search
CPC .......... H04B 10/11–116; H04B 10/112; H04B 10/114; H04B 10/116; H04B 10/69
(Continued)

(56) References Cited

U.S. PATENT DOCUMENTS 10,122,450 B2 11/2018 Videv et al.
2003/0063354 A1 4/2003 Davidson
(Continued)

FOREIGN PATENT DOCUMENTS

| JP | H0851400 A | 2/1996 |
| JP | 2006203873 A | 8/2006 |

(Continued)

*Primary Examiner* — Li Liu (57) ABSTRACT

To satisfy the application requirement to meet a high data rate and obtain a large coverage in an optical wireless communication system, an optical front-end subsystem (100) is disclosed in the present invention. The optical front-end subsystem (100) comprises a first photodiode (110) with a first active surface area and a second photodiode (120) with a second active surface area, wherein the second active surface area is larger than the first active surface area. Depending on the received signal strength, either the branch with the first photodiode (110) or the branch with the second photodiode (120) is selected to provide an output signal of the optical front-end subsystem (100). Receiver diversity is achieved by making use of the first photodiode to support high speed communication and the second photodiode to support large coverage communication.

14 Claims, 4 Drawing Sheets

(51) Int. Cl.
    *H04B 10/116*     (2013.01)
    *H04B 10/69*      (2013.01)
(58) Field of Classification Search
    USPC .......................................... 398/118–131, 208
    See application file for complete search history.

(56) References Cited

U.S. PATENT DOCUMENTS

| | | | |
|---|---|---|---|
| 2009/0027658 A1* | 1/2009 | Beausoleil | H04B 10/1121 356/73 |
| 2017/0373761 A1 | 12/2017 | Parker et al. | |
| 2021/0376927 A1* | 12/2021 | Sevo | H04B 10/11 |
| 2023/0388027 A1* | 11/2023 | Schill | G01J 1/44 |

FOREIGN PATENT DOCUMENTS

| | | |
|---|---|---|
| JP | 2007135144 A | 5/2007 |
| JP | 2011135206 A | 7/2011 |
| JP | 2017055375 A | 3/2017 |
| JP | 2018129095 A | 8/2018 |
| KR | 101307610 B1 | 9/2013 |
| KR | 20140129570 A | 11/2014 |
| KR | 20180065757 A | 6/2018 |
| WO | 2019016024 A1 | 1/2019 |

* cited by examiner

RECEIVING SYSTEM FOR HIGH SPEED AND LARGE COVERAGE OPTICAL WIRELESS COMMUNICATION

CROSS-REFERENCE TO PRIOR APPLICATIONS

This application is the U.S. National Phase application under 35 U.S.C. § 371 of International Application No. PCT/EP2021/070326, filed on Jul. 21, 2021, which claims the benefit of European Patent Application No. 20189817.8, filed on Aug. 6, 2020. These applications are hereby incorporated by reference herein.

FIELD OF THE INVENTION

The invention relates to the field of optical wireless communication networks, such as Li-Fi networks. More particularly, various methods, apparatus, systems, and computer-readable media are disclosed herein related to a system with receiver diversity to support high speed and large coverage optical wireless communication.

BACKGROUND OF THE INVENTION

To enable more and more electronic devices like laptops, tablets, and smartphones to connect wirelessly to the Internet, wireless communication confronts unprecedented requirements on data rates and also link qualities, and such requirements keep on growing year over year, considering the emerging digital revolution related to Internet-of-Things (IoT). Radio frequency technology like Wi-Fi has limited spectrum capacity to embrace this revolution. In the meanwhile, light fidelity (Li-Fi) is drawing more and more attention with its intrinsic security enhancement and capability to support higher data rates over the available bandwidth in visible light, Ultraviolet (UV), and Infrared (IR) spectra. Furthermore, Li-Fi is directional and shielded by light blocking materials, which provides it with the potential to deploy a larger number of access points, as compared to Wi-Fi, in a dense area of users by spatially reusing the same bandwidth. These key advantages over wireless radio frequency communication make Li-Fi a promising secure solution to mitigate the pressure on the crowded radio spectrum for IoT applications and indoor wireless access. Other possible benefits of Li-Fi include guaranteed bandwidth for a certain user, and the ability to function safely in areas otherwise susceptible to electromagnetic interference. Therefore, Li-Fi is a very promising technology to enable the next generation of immersive connectivity.

There are several related terminologies in the area of lighting-based communication. Visible-light communication (VLC) transmits data by intensity modulating optical sources, such as light emitting diodes (LEDs) and laser diodes (LDs), faster than the persistence of the human eye. VLC is often used to embed a signal in the light emitted by an illumination source such as an everyday luminaire, e.g. room lighting or outdoor lighting, thus allowing use of the illumination from the luminaires as a carrier of information. The light may thus comprise both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g. flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination.

The IEEE 802.15.7 visible-light communication personal area network (VPAN) standard maps the intended applications to four topologies: peer-to-peer, star, broadcast and coordinated. Optical Wireless PAN (OWPAN) is a more generic term than VPAN also allowing invisible light, such as UV and IR, for communication. Thus, Li-Fi is generally accepted as a derivative of optical wireless communications (OWC) technology, which makes use of the light spectrum in a broad scope to support bi-directional data communication.

In a Li-Fi system, the signal is embedded by modulating a property of the light, typically the intensity, according to any of a variety of suitable modulation techniques. For communication at high speed, often Infrared (IR) rather than visible light communication is used. Although the ultraviolet and infrared radiation is not visible to the human eye, the technology for utilizing these regions of the spectra is the same, although variations may occur as a result of wavelength dependencies, such as in the case of refractive indices. In many instances there are advantages to using ultraviolet and/or infrared as these frequency ranges are not visible to the human eye, and more flexibility can be introduced in the system. Of course, ultraviolet quanta have higher energy levels compared to those of infrared and/or visible light, which in turn may render use of ultraviolet light undesirable in certain circumstances.

Based on the modulations, the information in the light can be detected using any suitable light sensor or photodetector. For example, the light sensor may be a photodiode. The light sensor may be a dedicated photocell (point detector), an array of photocells possibly with a lens, reflector, diffuser, or phosphor converter (for lower speeds), or an array of photocells (pixels) and a lens for forming an image on the array. E.g., the light sensor may be a dedicated photocell included in a dongle which plugs into a user device such as a smartphone, tablet or laptop, or the sensor may be integrated and or dual-purpose, such as an array of infrared detectors initially designed for 3D face recognition. Either way this may enable an application running on the user device to receive data via the light.

Although a Li-Fi system has the potential to support very high data rate with its un-licensed bandwidth in the range of THz, currently commercially achievable bit rates are typically in the range of few hundreds of Mbps using spectral efficient modulations e.g., OFDM, due to the low intrinsic bandwidth (10-20 MHz) of LEDs (either visible or IR). Furthermore, it is quite appealing to have a Li-Fi system support a large coverage (e.g. 30-60 degrees according to the function of full width at half maximum (FWHM)). However, the large coverage requirement typically results in significant reduction in received optical power (high path loss, keeping the TX power under eye-safety limit), and hence it may further limit the overall throughput. On the other hand, laser, or vertical-cavity surface-emitting laser (VCSEL) based Li-Fi systems can support large modulation bandwidth. But due to the eye safety, the total amount of power emitted by laser/VCSEL is quite limited, and thus large coverage is still difficult to achieve.

SUMMARY OF THE INVENTION

For a LED based optical wireless communication system, low to medium data rates can be achieved with a relatively large FoV and long communication distance. For a laser/VCSEL based optical wireless communication system, higher data rates can be achieved with a relatively small coverage (narrow beam) and short communication distance. To leverage the benefits of both systems, inventors propose to employ diversity on active surface areas of the photodiodes at the receiver side. And hence, the optical receiver has the flexibility to support both high speed and large coverage optical wireless communication.

In view of the above, the present disclosure is directed to methods, apparatus, systems, computer program and computer-readable media for providing receiver diversity to enable a receiving system to achieve both high speed and large coverage. More particularly, the goal of this invention is achieved by an optical front-end subsystem as claimed in claim 1, by an optical receiver as claimed in claim 9, by an optical wireless communication system as claimed in claim 10, by a method of an optical front-end subsystem as claimed in claim 11, and by a computer program as claimed in claim 13.

In accordance with a first aspect of the invention an optical front-end subsystem is provided, wherein the optical front-end subsystem for receiving optical wireless communication signals comprises: a first photodiode with a first active surface area configured to receive a first optical signal; a second photodiode with a second active surface area configured to receive a second optical signal; a sniffer circuit configured to compare a received signal strength of the first optical signal with a predefined reference value; and a switch configured to select the received first optical signal as an output signal of the optical front-end subsystem when the received signal strength of the first optical signal is higher than the predefined reference value; and, otherwise, select the received second optical signal as the output signal of the optical front-end subsystem; wherein the second active surface area is larger than the first active surface area.

A photodiode is a semiconductor device that coverts light into electric current or voltage based on the operation mode of the device. Sometimes a photodiode is also called as a photo detector, a light detector, or a photo sensor. A photodiode may contain optical filters, built-in lenses, and may have large or small surface areas. A photodiode usually has a slower response time as its surface area increases. Depending on the construction of the device, photodiodes can be classified into different types, such as PN photodiode, Schottky photodiode, PIN photodiode, and Avalanche photodiode. Although different types of photodiodes may work in a slightly different way, the basic operation of these diodes remains the same. Beneficially, the optical front-end subsystem comprises at least two photodiodes, a first photodiode and a second photodiode. Here, the first photodiode and the second photodiode may be of the same type or different types of photodiodes, photo detectors, light detectors, or photo sensors.

An active surface area of a photodiode may also be called an effective active area, or a surface area. The first photodiode and the second photodiode have different active surface areas, resulting in different characteristics of the devices allowing them to cater for different receiving scenarios. The sniffer circuit is used to compare the received first optical signal from the first photodiode with a first predefined reference value. When the received signal strength of the first optical signal is higher than the predefined reference value, the received first optical signal is selected as an output signal of the optical front-end subsystem. Otherwise, the received second optical signal is selected as the output signal of the optical front-end subsystem. The first predefined reference value may be configured in a factory pre-set, and the value may be dedicated to the type of the first photodiode. The first predefined reference value may also be dedicated to the type of the first photodiode given the size of the first active surface area. The first predefined reference value may also be configured during the physical installation of the optical front-end subsystem in the field. In a further example, the first predefined reference value may be configured by a user according to a system setup, a user scenario, an application requirement, or a user preference. By adjusting the first predefined reference value, or essentially the selection criterion, the optical front-end subsystem may preferentially select either the first optical signal received by the first photodiode or the second optical signal received by the second photodiode.

Preferably, the second active surface area is at least two times of the first active surface area.

A larger active surface area helps a photodiode to produce more current in response to incident light, but at the expense of higher junction capacitance, and hence lower speed or narrower signal bandwidth. The present invention aims to employ the first photodiode and the second photodiode with sufficient differences in active surface area size to cater for different application scenario.

As mentioned before, a LED based optical wireless communication system is characterized by a relatively long communication distance and large coverage, but low to mediate data rates, while a VCSEL based optical wireless communication system is characterized by high data rates, but a relatively small angular coverage with a narrow FoV. Thus, when the received first optical signal is adopted as the output signal of the optical front-end subsystem, it may be used in conjunction with a VCSEL based transmitter. When the received second optical signal is adopted as the output signal of the optical front-end subsystem, it may be used in conjunction with a LED based transmitter. When the transmitter is of a hybrid setup, such as a hybrid front end with both a LED and a VCSEL, the optical front-end subsystem may adaptively select the optimal photodiode according to the received signal strength of the optical signal detected by the photodiode. This is because the impact of an actual user scenario, such as the actual distance from the transmitter, the incident angle of the light, the intensity of the light, and the path loss is finally reflected on the signal strength of the optical signal detected by the photodiode.

Advantageously, the first photodiode is further configured to receive the first optical signal within a first signal collection area and the second photodiode is further configured to receive the second optical signal within a second signal collection area, and the second signal collection area is larger than the first signal collection area.

The signal collection area of a photodiode should be understood as the coverage of the photodiode for receiving optical signals. Sometimes, the coverage is also defined as an angular coverage, or a field of view (FoV). Typically, a bare photodiode without any lens has a relatively wide FoV (such as 120 degrees), and then a lens on it will define the final or actual FoV. The lens may be a built-in lens of the photodiode.

Note that only the incident light projected on the active surface area can be collected by the photodiode and be converted to an electric signal, either in a form of a current signal or a voltage signal. Normally, a small area photodiode collects less light and requires an additional optic (lens) to increase the optical signal collection. The lens would focus the incident light-beam on this small active area. But if a large angle of incidence (wide FoV) is required, then the size of the image produced by the lens will also increase and part of focus light-beam misses the active area, therefore it imposes a tradeoff between angular incident coverage vs amount of light collection. Thus, to collect optical signals efficiently, it is beneficial that the first photodiode with smaller active surface area also has a narrower FoV, as compared to the second photodiode.

In a preferred setup, the first signal collection area is fully covered by the second signal collection area.

It was known that inhomogeneity on the edge of an active surface area of the photodiode, or photo detector, may generate unwanted capacitance and resistance that distorts the time-domain response of a photodiode. Thus, it is also preferred that the incident light on the photodiode is well centered on the active surface area, or active area. Thus, it may be beneficial to have the first signal collection area fully covered by the second signal collection area. In addition, it is also beneficial to have the first signal collection area and the second signal collection area centered at the same point.

Advantageously, the first photodiode is configured to support a higher data rate than the second photodiode.

As aforementioned, a junction capacitance has a profound impact on the photodiode's bandwidth and response speed. The junction capacitance is directly proportional to the active surface area. A large active surface area of a photodiode encompasses greater junction volume with increased junction capacitance. Hence, the smaller active surface area of the first photodiode allows a larger signal bandwidth as compared to the second photodiode. Accordingly, a higher data rate can be supported by the first photodiode.

Preferably, the sniffer circuit further comprises a Root Mean Square, RMS, detector configured to estimate a received signal strength.

The sniffer circuit needs to measure the signal strength of the received first optical signal and compare that signal strength with a predefined reference value. Thus, the sniffer circuit comprises a signal strength detector. In a preferred example, the signal strength detector is a Root Mean Square, RMS, detector. In another example, the signal strength detector may be a peak detector, although for an OFDM based system, peaks values are a less well conditioned statistical variable. In a further example, the signal strength detector may be an AC component average detector.

The switch may be a MOSFET or a transistor.

In one embodiment, the optical front-end subsystem further comprises: a first amplifier, connected to the first photodiode, configured to amplify the received first optical signal using a first amplifier circuit customized to a characteristic of the first photodiode; and a second amplifier, connected to the second photodiode, configured to amplify the received second optical signal using a second amplifier circuit customized to a characteristic of the second photodiode; and wherein the sniffer circuit is further configured to compare the received signal strength of the first optical signal with a second predefined reference value, after the first optical signal is amplified by the first amplifier.

Considering the fact that the output electrical signal from a photodiode is usually pretty small, an amplifier is typically employed to amplify the small signal from the photodiode so that it can be big enough for further processing in the receiver chain. The amplify is typically customized and/or configured according to the properties of the photodiode preceding it, such that the signal quality is not degraded due to thermal noise introduced by the amplifier itself and to maintain enough signal bandwidth to preserve the information carried by the signal. For example, the amplifier should provide enough gain to avoid a degradation on SNR. But on the other hand, too much gain may lead to unnecessary complexity, cost, and power consumption. Furthermore, the second order effect of the photodiode capacitance may cause excessive noise gain increase at a higher frequency, which may even degrade signal quality at the higher frequency range. In addition, one or more of other parameters may be considered, such as the total input capacitance, photodiode signal range, required bandwidth, and required swing with the minimal signal. It can be seen that there are many design tradeoffs in order to customize and/or optimize the amplifier with regard to an individual photodiode. Thus, it may be advantageous to have the sniffer circuit to compare the received signal strength of the first optical signal with the reference value after the amplifying stage, in order to benefit from the optimized design of the first amplifier.

Preferably, the first amplifier and/or the second amplifier is a transimpedance amplifier, TIA.

A TIA is a type of current-to-voltage converter, which is commonly used with sensors, when they have a current response that is more linear than a voltage response. TIAs are very often used as a first stage amplifier to condition the received signals of a photodiode.

In another embodiment, the optical front-end subsystem further comprises: a third photodiode with a third active surface area configured to receive a third optical signal, and wherein the third active surface area is larger than the first active surface area but smaller than the second active surface area; and wherein the sniffer circuit is further configured to compare a received signal strength of the third optical signal with a predefined third reference value; and the switch is further configured to select the received first optical signal as the output signal of the optical front-end subsystem when the received signal strength of the first optical signal is higher than the predefined reference value; and, to select the received third optical signal as an output signal of the optical front-end subsystem when the received signal strength of the first optical signal is not higher than the predefined reference value and the received signal strength of the third optical signal is higher than the third predefined reference value; and, otherwise, select the received second optical signal as the output signal of the optical front-end subsystem.

Preferably the second active surface area is at least two times of the first active surface area. The ratio may be much bigger than two times. For example, the second active surface area may be more than 10 times of the first active surface area to satisfy different application requirements. It may also be that there is a third photodiode deployed in the optical front-end subsystem, which has an active surface area bigger than the first active surface area but smaller than the second active surface area. And thus, the sniffer circuit is configured to first check the received signal strength of the first optical signal with a predefined reference value, and to select the received first optical signal as the output of the optical front-end subsystem when the requirement is satisfied. Otherwise, the sniffer circuit is configured to further check the received signal strength of the third optical signal with a predefined third reference value, and to select the received third optical signal as the output of the optical front-end subsystem when the requirement is satisfied. Otherwise, the received second optical signal is selected as the output. In this way, the optical front-end subsystem is configured to preferentially activate a receiving path with the highest possible bandwidth. Note that, there may be a further photodiode employed by the optical front-end subsystem, as long as the extra hardware cost is justified by the diversified application needs.

The third photodiode is configured to receive the third optical signal within a third signal collection area. Preferably, the third signal collection area is larger than the first signal collection area but smaller than the second signal collection area.

In accordance with a second aspect of the invention an optical receiver is provided. An optical receiver for receiving optical wireless communication signals, the optical receiver comprises: an optical front-end subsystem according to the present invention; an analog front-end component configured to receive an input signal from the optical front-end subsystem for analog processing; and a modem component configured to implement baseband processing on an output of the analog processed signal from the analog front-end component.

The disclosed optical front-end subsystem may be coupled with an analog front end and a modem to complete the optical receiver chain. Since only one receiving path is enabled after the selection in the optical front-end subsystem, the analog front end and the modem may be the same as in a convention optical receiver.

In accordance with a third aspect of the invention an optical wireless communication system is provided. An optical wireless communication system, the optical wireless communication system comprises: an optical receiver according to the present invention; an optical transmitter comprising one or more optical front-ends, and wherein each one of the one or more optical front-ends comprises a light source; and wherein the optical receiver is configured to receive optical wireless communication signals transmitted by the optical transmitter.

The disclosed optical receiver is capable to deal with different transmitter setups, and to provide best receiving capability adaptive to an actual application scenario. In the disclosed optical wireless communication system, the transmitter may comprise one or more optical front ends, with each comprising a light source. The light source may be one of a light-emitting diode (LED), a laser diode, a vertical-cavity surface-emitting laser (VCSEL), or a hybrid front-end with both LED and VCSEL.

In accordance with a fourth aspect of the invention a method of an optical front-end subsystem is provided. A method of an optical front-end subsystem for receiving optical wireless communication signals, the method comprises the optical front-end subsystem: receiving, by a first photodiode with a first active surface area, a first optical signal; receiving, by a second photodiode with a second active surface area, a second optical signal; comparing, a received signal strength of the first optical signal with a predefined reference value; and selecting, the received first optical signal as an output signal of the optical front-end subsystem when the received signal strength of the first optical signal is higher than the predefined reference value; and, otherwise, selecting the received second optical signal as the output signal of the optical front-end subsystem; wherein the second active surface area is larger than the first active surface area.

Advantageously, the method further comprising the optical front-end subsystem: receiving, by a third photodiode with a third active surface area, a third optical signal, and wherein the third active surface area is larger than the first active surface area but smaller than the second active surface area; comparing, a received signal strength of the third optical signal with a predefined third reference value; and selecting the received first optical signal as the output signal of the optical front-end subsystem when the received signal strength of the first optical signal is higher than the predefined reference value; or the received third optical signal as an output signal of the optical front-end subsystem when the received signal strength of the first optical signal is not higher than the predefined reference value and the received signal strength of the third optical signal is higher than the third predefined reference value; or the received second optical signal as the output signal of the optical front-end subsystem when the received signal strength of the first optical signal is not higher than the predefined reference value and the received signal strength of the third optical signal is not higher than the third predefined reference value.

The invention may further be embodied in a computing program comprising code means which, when the program is executed by an optical front-end subsystem comprising processing means, cause the processing means to perform the method of the optical front-end subsystem as disclosed in the present invention.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

Figure 1:
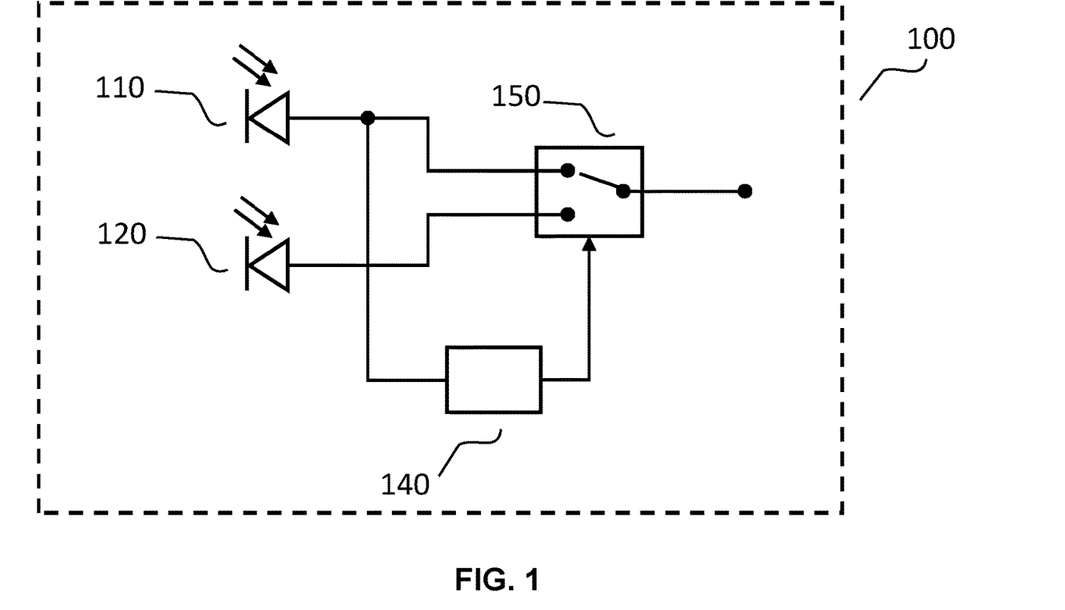
FIG. 1 illustrates one possible system setup of an optical front-end subsystem of the present invention.

Various embodiments of the present invention will now be described based on an optical front-end subsystem 100 as shown in FIG. 1. As a basic setup, the optical front-end subsystem 100 comprises a first photodiode 110, a second photodiode 120, a sniffer circuit 140, and a switch 150. The first photodiode 110 and the second photodiode 120 may be of the same type or different types of photodiodes. Here, photodiodes should be understood in a broad sense, such as photo sensors, light sensors, or photo detectors, which have an active surface area. The first photodiode 110 differs from the second photodiode 120 in the size of the active surface area. The second active surface area of the second photodiode 120 is larger than the first active surface area of the first photodiode 110. Thus, different response times are provided by the first photodiode 110 and the second photodiode 120. Accordingly, with a smaller active surface area, the first photodiode 110 is capable to support higher data rate communication as compared to the second photodiode 120. When the distance from an optical transmitter is increased, the received signal strength of the first photodiode is not sufficient, such as according to the comparison result obtained by the sniffer circuit. The optical front-end subsystem 100 is configured to make use of the second photodiode to collect energy from the second signal collection area, or a wider FoV as compared to the first signal collection area. Since the active surface area is larger with the second photodiode, the second photodiode is configured to conduct optical receiving for low to medium data rates communication.

Ideally, the first photodiode is used to pair with a high-speed narrow beam optical transmitter, such as a VCSEL based optical transmitter. The second photodiode is used to pair with a medium to low speed wide beam optical transmitter, such as a LED based optical transmitter. Thus, by making use of an active area diversity feature, the disclosed optical front-end subsystem may enjoy the benefits of both high speed and wide coverage optical communication in an adaptive manner upon selection.

In a conventional segmented optical receiver, more than one uniform photodiode or optical detectors are enabled simultaneously, with each directed to a different orientation and covering a wide FoV in combination. Normally to have a decent coverage, the optical receiver may need 4 or more photodiodes. To achieve a high data rate, each photodiode may have a quite narrow FoV, and then more photodiodes may be needed to cover the entire signal collection area. Thus, as compared to the segmented solution, the disclosed system has the advantages on flexibility, low hardware cost, and low power consumption.

Figure 2:
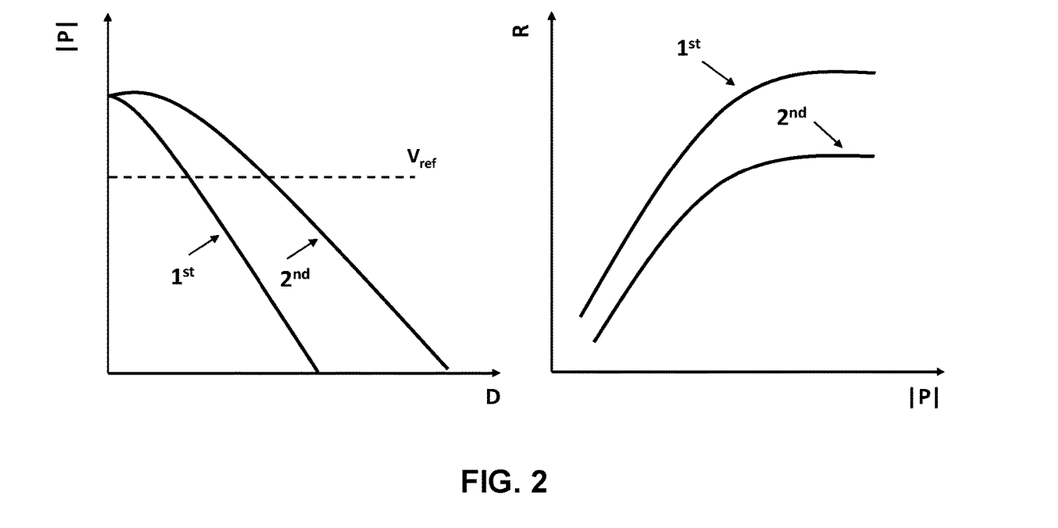
FIG. 2 demonstrates the concept of receiver diversity resulted from different active surface areas.

FIG. 2 demonstrates the receiver diversity resulting from different active surface areas of the first photodiode and the second photodiode. In the left figure, x-axis represents the distance D between the optical front-end subsystem and an optical transmitter, and y-axis represents the normalized power |P| of the received optical signal. $V_{ref}$ indicates the predefined reference value used as a threshold to compare with the received signal strength of an optical signal. In the right figure, x-axis represents the normalized power |P| of the received optical signal, and y-axis represents the data rate R to be supported. The curves are indicated by $1^{st}$ and $2^{nd}$ to distinguish between the characteristics between the first photodiode and the second photodiode. From FIG. 2, it can be seen that at a same distance from the optical transmitter, the second photodiode is capable of collecting more energy as compared to the first photodiode, because of its larger active surface area. In other words, to collect the same energy, the first photodiode either has a short communication distance or a narrow FoV. However, with the same normalized received power, the first photodiode is capable of supporting higher data rates, because of its smaller junction capacitance and shorter response time. In that sense, the first photodiode is used to cover the application scenarios of relatively short distance but high data rate communication, while the second photodiode is used to cover the application scenarios of relatively longer communication distance but low to medium data rate communication.

In combination, the disclosed optical front-end subsystem is capable of covering both large coverage and high data rate application requirements. The improved flexibility is provided with a relatively low hardware cost and system complexity.

Figure 3:
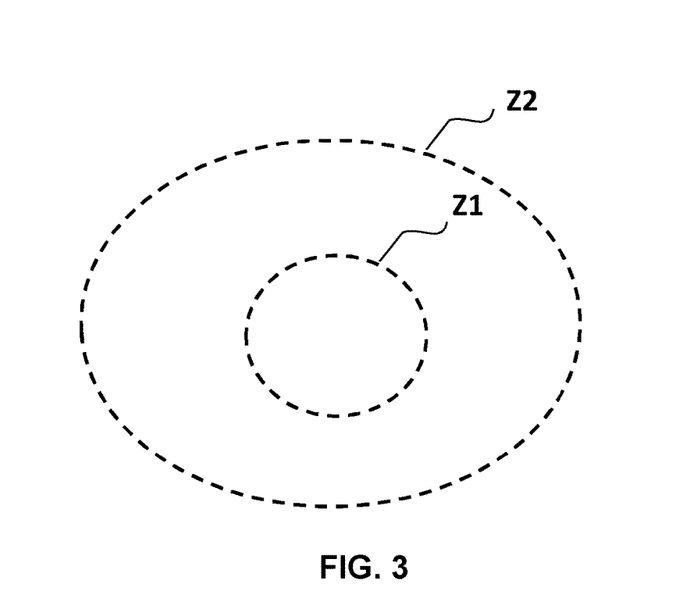
FIG. 3 demonstrates one example of arrangement of first signal collection area and the second signal collection area.

The first photodiode is configured to receive the first optical signal within a first signal collection area Z1, and the second photodiode is configured to receive the second optical signal within a second signal collection area Z2. For illustration purpose only, FIG. 3 provides one example of an arrangement of first signal collection area Z1 and the second signal collection area Z2. Z1 and/or Z2 may have a symmetric shape but may also be of an irregular shape. In this example, Z1 and Z2 both have a symmetric shape, and Z1 is fully covered by Z2. In another example, Z1 and Z2 may partially overlap, or may not overlap at all. The size and shape of the first signal collection area Z1 and the second signal collection area Z2 are mainly determined by the lens on the first photodiode and the second photodiode. The design of the lens should take the active surface area of an individual photodiode into account in order to achieve a good efficiency in collecting optical energy.

Figure 4:
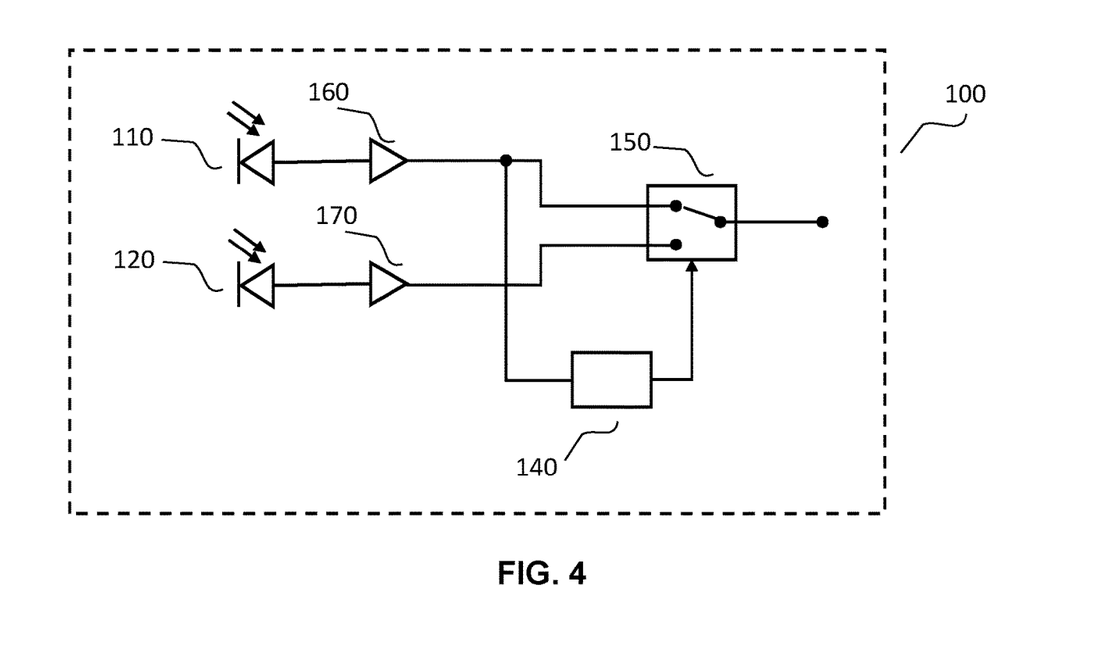
FIG. 4 illustrates another possible system setup of an optical front-end subsystem of the present invention.

FIG. 4 illustrates another possible system setup of an optical front-end subsystem of the present invention. In this setup, a first amplifier 160 customized to a characteristic of the first photodiode 110 is connected to the first photodiode 110 to amplify the received first optical signal before the first optical signal is assessed by the sniffer circuit 140. Similarly, a second amplifier 170 customized to a characteristic of the second photodiode 120 is connected to the second photodiode 120 to amplify the received second optical signal. One or more characteristics or parameters related to an individual photodiode may be considered here, such as the total input capacitance, photodiode signal range, required bandwidth, and required swing with the minimal signal. Thus, in this example, the assessment of the sniffer circuit is based on received optical signal after being conditioned by the amplifier. Because the output electrical signal from a photodiode is typically pretty small, to amplify such small signal from the photodiode to a sufficiently big signal is beneficial for further processing. With the first amplifier 160 dedicated to the first photodiode 110 and the second amplifier 170 dedicated to the second photodiode 120, customized design can be applied to an amplifier considering the properties of a photodiode preceding it. Thus, the optical front-end subsystem is further optimized in the two branches, as compared to the option that another amplified is placed after the switch to process either the received first optical signal or the received second optical signal, depending on the selection being made.

Figure 5:
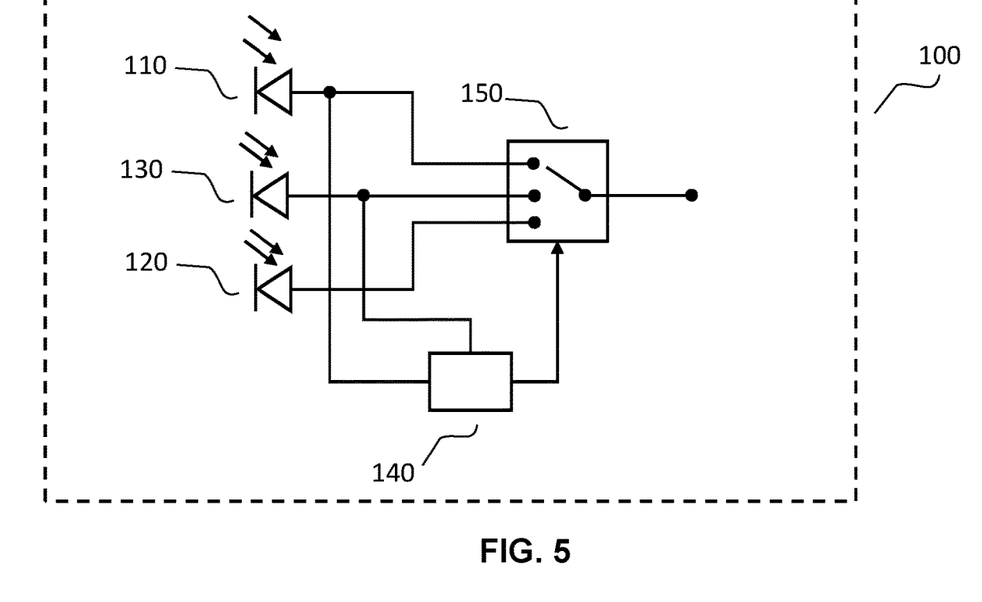
FIG. 5 illustrates a further possible system setup of an optical front-end subsystem of the present invention.

FIG. 5 illustrates a further possible system setup of an optical front-end subsystem of the present invention. A third photodiode 130 is employed, which has a third active surface area larger than the first active surface area of the first photodiode but smaller than the second active surface area of the second photodiode. As already disclosed, the second active surface area is at least two times of the first active surface area, and the ratio can be as large as 10 times or more. Thus, the third photodiode with a third active surface area that has a size between the first active surface area and the second active surface area. The optical front-end subsystem is further enhanced with one more fine-tuned receiving chain to provide a balance between system complexity and the requirements to cover a large variety of application scenarios. In another scenario, the optical front-end subsystem may be further extended with a further photodiode, as long as the hardware cost and complexity is justified by the application needs.

It should be note that the setup in FIG. 5 is built on top of the system setup as disclosed in FIG. 1. It may also be that the embodiment of employing a third photodiode 130 is used in combination with the embodiment demonstrated in FIG. 4, where a third amplifier will be placed directly after the third photodiode 130 and before the sniffer circuit 140.

Figure 6:
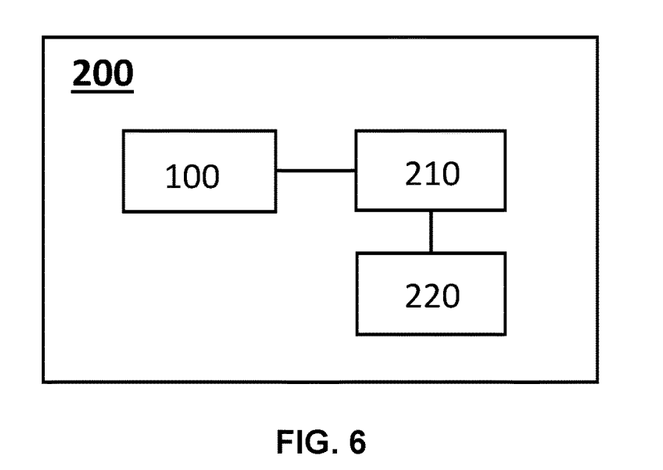
FIG. 6 schematically depicts basic components of an optical receiver of the present invention.

FIG. 6 schematically depicts basic components of an optical receiver 200 of the present invention. The optical receiver 200 comprises at least an optical front-end subsystem 100 as disclosed above, an analog front-end component 210, and a modem component 220. The analog front-end component receives an input signal from the optical front-end subsystem 100 for analog processing; and the modem component is configured to implement baseband processing on an output of the analog processed signal from the analog front-end component 210. Although the optical front-end subsystem 100 comprises more than one photodiode to provide receiving diversity, the selection among the more than one photodiode is implemented inside the optical front-end subsystem 100, and only a single output signal is provided to the next component, the analog front-end component 210, in the receiver chain. Thus analog front-end component and the modem component may use the same hardware as used in a conventional optical receiver, although the processing capability, such as the bandwidth and clock speed, should be sufficient to process the received signals from either the first photodiode or the second photodiode.

Figures 7, 8:
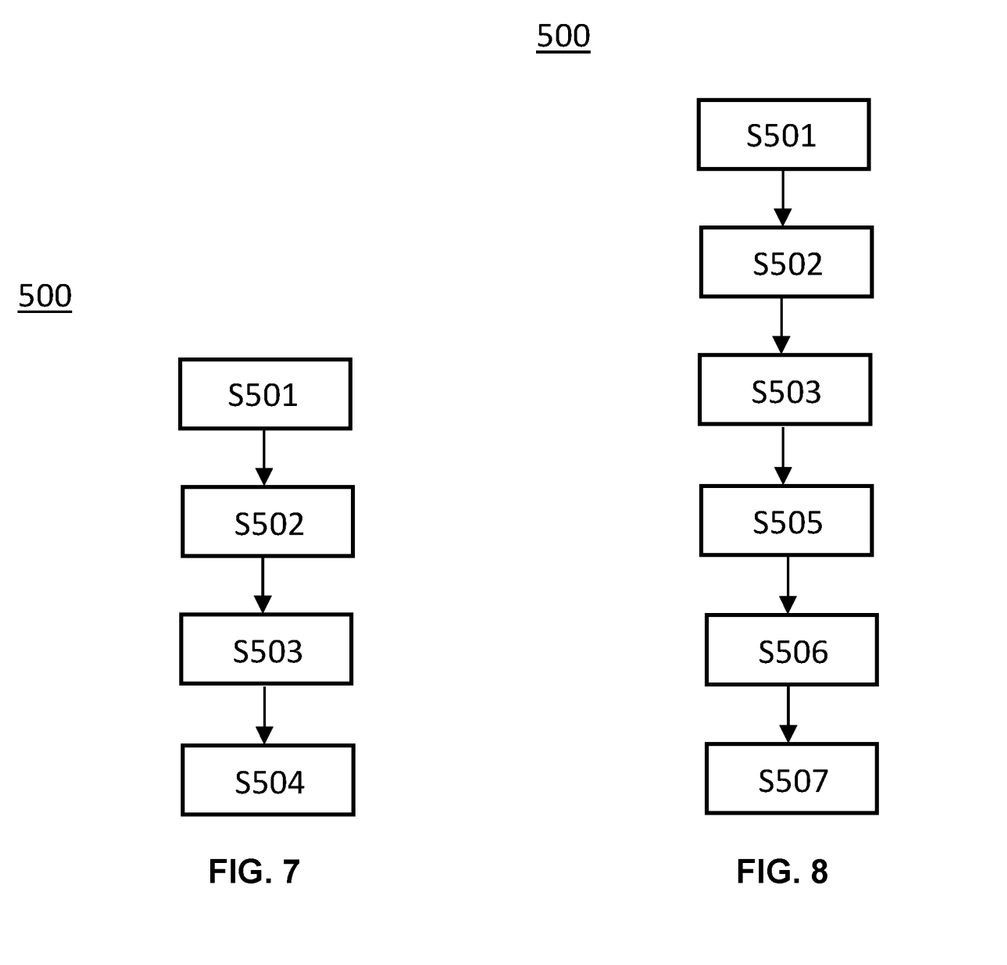
FIG. 7 shows a flow chart of a method of the optical front-end subsystem.
FIG. 8 shows a flow chart of a method of the optical front-end subsystem.

The optical receiver 200 may be used to build up an optical communication link with an optical transmitter in an optical communication system. Given the flexibility provided by the optical receiver, the optical transmitter may comprise one or more optical front-ends as well. A single optical front-end comprises a light source for transmitting an optical signal. The light source can be a LED, a laser diode, a VCSEL, or a hybrid front-end with both LED and VCSEL FIG. 7 shows a flow chart of a method 500 of an optical front-end subsystem 100 for receiving optical wireless communication signals, the method 500 comprises the optical front-end subsystem 100 receiving in step S501, by a first photodiode 110 with a first active surface area, a first optical signal; receiving in step S502, by a second photodiode 120 with a second active surface area, a second optical signal. Then, in step S503, the optical front-end subsystem 100 compares a received signal strength of the first optical signal with a predefined reference value; and in step S504 selects the received first optical signal as an output signal of the optical front-end subsystem when the received signal strength of the first optical signal is higher than the predefined reference value; and, otherwise, selects the received second optical signal as the output signal of the optical front-end subsystem 100; wherein the second active surface area is larger than the first active surface area.

FIG. 8 shows a flow chart of another implementation of the method 500 of the optical front-end subsystem 100. The method 500 comprises the optical front-end subsystem 100 receiving in step S501, by a first photodiode 110 with a first active surface area, a first optical signal; receiving in step S502, by a second photodiode 120 with a second active surface area, a second optical signal. Then, in step S503, the optical front-end subsystem 100 compares a received signal strength of the first optical signal with a predefined reference value. In step S505, the method comprises the optical front-end subsystem 100 receiving, by a third photodiode 130 with a third active surface area, a third optical signal, and wherein the third active surface area is larger than the first active surface area but smaller than the second active surface area. In step S506, the optical front-end subsystem 100 compares, a received signal strength of the third optical signal with a predefined third reference value; and selects in step S507:

the received first optical signal as the output signal of the optical front-end subsystem when the received signal strength of the first optical signal is higher than the predefined reference value; or the received third optical signal as an output signal of the optical front-end subsystem when the received signal strength of the first optical signal is not higher than the predefined reference value and the received signal strength of the third optical signal is higher than the third predefined reference value; or the received second optical signal as the output signal of the optical front-end subsystem when the received signal strength of the first optical signal is not higher than the predefined reference value and the received signal strength of the third optical signal is not higher than the third predefined reference value.

The third photodiode is configured to receive the third optical signal within a third signal collection area. Preferably, the third signal collection area is larger than the first signal collection area Z1 but smaller than the second signal collection area Z2.

The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer.

Methods, systems, and computer-readable media (transitory and non-transitory) may also be provided to implement selected aspects of the above-described embodiments.

The term "controller" is used herein generally to describe various apparatus relating to, among other functions, the operation of one or more network devices or coordinators. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network.

The invention claimed is:

1. An optical front-end subsystem for receiving optical wireless communication signals, the optical front-end subsystem comprising:
   a first photodiode with a first active surface area configured to receive a first optical signal;
   a second photodiode with a second active surface area configured to receive a second optical signal;
   a sniffer circuit configured to compare a received signal strength of the first optical signal with a predefined reference value; and
   a switch configured to select the received first optical signal as an output signal of the optical front-end subsystem when the received signal strength of the first optical signal is higher than the predefined reference value; and, otherwise, select the received second optical signal as the output signal of the optical front-end subsystem;
   wherein the second active surface area is larger than the first active surface area.

2. The optical front-end subsystem according to claim 1, wherein the second active surface area is at least two times of the first active surface area.

3. The optical front-end subsystem according to claim 1, wherein the first photodiode is further configured to receive the first optical signal within a first signal collection area and the second photodiode is further configured to receive the second optical signal within a second signal collection area, and the second signal collection area is larger than the first signal collection area.

4. The optical front-end subsystem according to claim 1, wherein the first signal collection area is fully covered by the second signal collection area.

5. The optical front-end subsystem according to claim 1, wherein the first photodiode is configured to support a higher data rate than the second photodiode.

6. The optical front-end subsystem according to claim 1, wherein the sniffer circuit further comprises a Root Mean Square, RMS, detector configured to estimate a received signal strength.

7. The optical front-end subsystem according to claim 1, the optical front-end subsystem further comprises:
   a first amplifier connected to the first photodiode and configured to amplify the received first optical signal using a first amplifier circuit customized to a characteristic of the first photodiode; and
   a second amplifier, connected to the second photodiode, configured to amplify the received second optical signal using a second amplifier circuit customized to a characteristic of the second photodiode; and
wherein the sniffer circuit is further configured to compare the received signal strength of the first optical signal with a second predefined reference value, after the first optical signal is amplified by the first amplifier.

8. The optical front-end subsystem of claim 7, wherein the first amplifier and/or the second amplifier is a transimpedance amplifier, TIA.

9. The optical front-end subsystem according to claim 1, the optical front-end subsystem further comprising:
   a third photodiode with a third active surface area configured to receive a third optical signal, and wherein the third active surface area is larger than the first active surface area but smaller than the second active surface area; and
   wherein the sniffer circuit is further configured to
   compare a received signal strength of the third optical signal with a predefined third reference value; and
the switch is further configured to
   select the received first optical signal as the output signal of the optical front-end subsystem when the received signal strength of the first optical signal is higher than the predefined reference value; and, to select the received third optical signal as an output signal of the optical front-end subsystem when the received signal strength of the first optical signal is not higher than the predefined reference value and the received signal strength of the third optical signal is higher than the third predefined reference value; and, otherwise, select the received second optical signal as the output signal of the optical front-end subsystem.

10. An optical receiver for receiving optical wireless communication signals, the optical receiver comprising:
    an optical front-end subsystem according to claim 1;
    an analog front-end component configured to receive an input signal from the optical front-end subsystem for analog processing; and
    a modem component configured to implement baseband processing on an output of the analog processed signal from the analog front-end component.

11. An optical wireless communication system, the optical wireless communication system comprising:
    an optical receiver of claim 10;
    an optical transmitter comprising one or more optical front-ends, and wherein each one of the one or more optical front-ends comprises a light source;
    and wherein the optical receiver is configured to receive optical wireless communication signals transmitted by the optical transmitter.

12. A method of an optical front-end subsystem for receiving optical wireless communication signals, the method comprising the optical front-end subsystem:
    receiving, by a first photodiode with a first active surface area, a first optical signal;
    receiving, by a second photodiode with a second active surface area, a second optical signal;
    comparing, a received signal strength of the first optical signal with a predefined reference value; and
    selecting, the received first optical signal as an output signal of the optical front-end subsystem when the received signal strength of the first optical signal is higher than the predefined reference value; and, otherwise, selecting the received second optical signal as the output signal of the optical front-end subsystem;
wherein the second active surface area is larger than the first active surface area.

13. The method according to claim 12, the method further comprising the optical front-end subsystem:
    receiving, by a third photodiode with a third active surface area, a third optical signal, and wherein the third active surface area is larger than the first active surface area but smaller than the second active surface area;
    comparing, a received signal strength of the third optical signal with a predefined third reference value; and
    selecting
        the received first optical signal as the output signal of the optical front-end subsystem when the received signal strength of the first optical signal is higher than the predefined reference value; or the received third optical signal as an output signal of the optical front-end subsystem when the received signal strength of the first optical signal is not higher than the predefined reference value and the received signal strength of the third optical signal is higher than the third predefined reference value; or the received second optical signal as the output signal of the optical front-end subsystem when the received signal strength of the first optical signal is not higher than the predefined reference value and the received signal strength of the third optical signal is not higher than the third predefined reference value.

14. A non-transitory computing readable medium comprising instructions which, when the instructions are executed by an optical front-end subsystem comprising a processor, cause the processor to perform the method of claim 12.

* * * * *